Nov. 14, 1933.  L. DREYFUS  1,935,047
WINDING FOR ELECTRICAL INDUCTION FURNACES
WITHOUT A CLOSED FERROMAGNETIC CIRCUIT
Filed Aug. 29, 1932
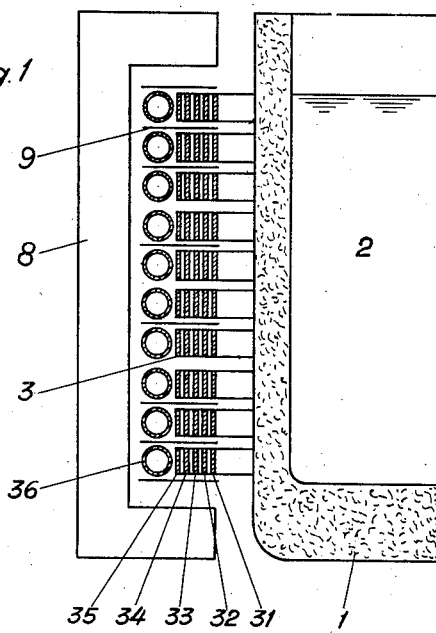
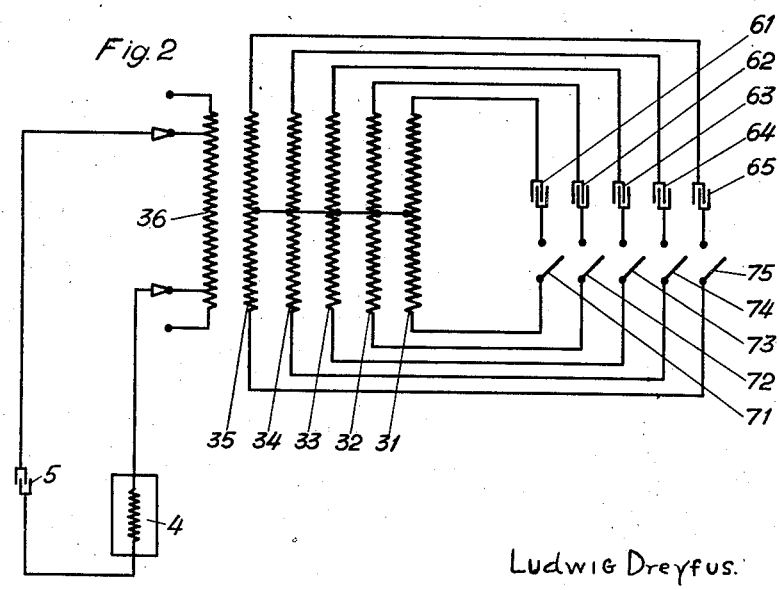
Ludwig Dreyfus.
INVENTOR
BY
Wm Wallace White.
ATTORNEY.

Patented Nov. 14, 1933

1,935,047

UNITED STATES PATENT OFFICE 1,935,047

WINDING FOR ELECTRICAL INDUCTION FURNACES WITHOUT A CLOSED FERRO-MAGNETIC CIRCUIT

Ludwig Dreyfus, Vasteras, Sweden, assignor to Allmänna Svenska Elektriska Aktiebolaget, Vasteras, Sweden, a corporation of Sweden Application August 29, 1932, Serial No. 630,802, and in Sweden August 29, 1931

4 Claims. (Cl. 219—47)

Various means have been proposed in order to equalize the current distribution in the primary winding of electrical induction furnaces without a closed ferro-magnetic circuit, the current distribution of which otherwise has a tendency to get extremely uneven on account of the large leakage inductance. The present invention relates to a simple and at the same time efficient arrangement for this purpose, consisting in dividing the winding into a number of sections, of which a part only are connected to the supply, the remaining part being merely inductively related with the first part, and each section of the second part is connected to a condenser which supplies the reactive power demand of the winding section in question. One or more sections can be fed from a generator, in the latter case preferably from electrically separate windings on the generator. In the other winding sections a current is induced, the value of which substantially depends upon the capacity of the condenser connected in parallel with each winding section. In this way a practically uniform distribution of the inductive current load between the different sections can be obtained by a suitable dimensioning of the condensers.

Geometrically the different sections can be arranged in different ways with respect to each other, but generally it is most suitable to arrange them as different layers parallel to each other and to the surface of the charge, for example, as cylindrical, concentric layers, if the charge is cylindrical.

One form of the invention arranged in the last mentioned way is diagrammatically shown in Figure 1, while Figure 2 shows a corresponding diagram of connections.

In Figure 1, 1 is the crucible and 2 the charge both assumed to be cylindrical with only one half shown. The furnace winding 3 consists of six concentric, cylindrical winding sections, of which the five innermost sections 31, 32, 33, 34, 35, consist of flat copper, wound edgewise, while the outmost section 36 consists of tube-shaped conductors, which at the same time may serve the purpose of conducting a cooling medium. The different sections can be connected according to Figure 2, i. e. so that only one section for instance the outmost one 36 is connected to a generator 4, preferably in series with a capacity 5 which compensates the self inductance of the generator, while the other sections are connected each one to a condenser 61—65 by means of switches 71—75, so that a larger or smaller number of the sections can be put into function.

The mode of operation of the connection described can be appropriately characterized in such a manner, that the winding 36 substantially carries only the active component of the furnace's primary current, while the other winding sections exclusively carry reactive currents produced by the condensers. As the reactive power consumption generally increases during the melting of the charge, more winding sections with corresponding condensers may be gradually connected in circuit during such melting. It is to be recommended to start with the innermost sections and to continue with the outer ones.

If it is required to divide the winding of the furnace into a number of sections, which is larger than the proportion between reactive and active power at the highest admittance, the generator is preferably connected to more than one of these sections, so that the current load will be about the same on each section. This means that the proportion of the sections, counted in active conductor area, which is connected to the generator, is about the same as the proportion of active power demand of the furnace to the sum of active and reactive power demand. The section or sections connected to the generator may of course also have condensers in parallel. The generator is preferably connected to adjustable taps on the sections.

The different winding turns in each section may preferably decrease in section (height) towards the ends, in order to reduce the eddy current losses caused by radial leakage flux. For the same purpose, iron laminations 9 may be inserted between the winding turns in accordance with the patent application No. 630,801 filed August 29, 1932. An iron shell 8 preferably surrounds the whole winding.

The conductor area may also vary from section to section and may in such a case preferably decrease outwards, whereby the eddy current losses caused by the axial leakage flux are kept at about the same value in the different sections.

The winding sections which are not connected to the generator need not be connected together at any point. It may, however, be suitable to connect their midpoints together, whereby the voltages between the terminals of the different sections are reduced to the lowest possible value. For the same purpose, the inner coils can be wound with somewhat higher number of turns than the outer ones. For larger furnaces each section may comprise only a fraction, for instance one half, of a cylindrical winding layer.

Each section can also consist of several parallel coils, connected together at both ends. In such a case the coils should be "screwed" in relation to each other, in order to obtain a uniform current distribution. A "screwing" may also occur between adjacent sections.

I claim as my invention:—

1. In electrical induction furnaces, a receptacle, a winding divided in sections having the smallest possible leakage therebetween surrounding said receptacle, some of said sections being connected to a source of alternating current while the other sections form closed circuits with condensers.

2. In electrical induction furnaces, a receptacle, a winding in several layers surrounding said receptacle, some of said layers being connected to a source of alternating current while the other layers form closed circuits with condensers.

3. In electrical induction furnaces, a receptacle, a winding divided in sections having the smallest possible leakage therebetween surrounding said receptacle, some of said sections being connected to a source of alternating current, other sections connected together at a point near the middle of each section and forming closed circuits with condensers.

4. In electrical induction furnaces, a receptacle, a winding in several layers surrounding said receptacle, some of said layers being connected to a source of alternating current, other layers lying closer to the receptacle than the first-named ones and forming closed circuits with condensers.

LUDWIG DREYFUS.